I. R. RENNER.
CORD TIRE AND METHOD OF MAKING THE SAME.
APPLICATION FILED JUNE 17, 1916.
1,259,289.
Patented Mar. 12, 1918.
4 SHEETS—SHEET 1.
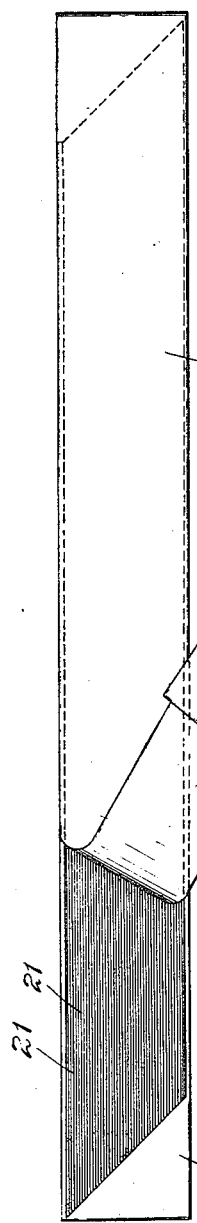
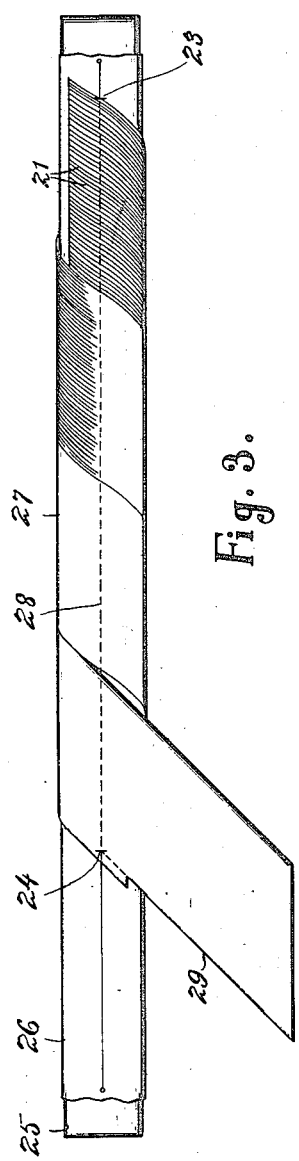
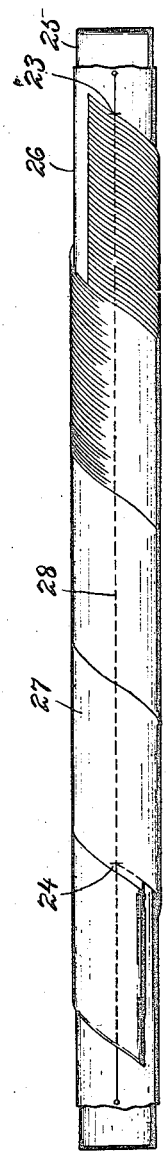
INVENTOR.
J. R. Renner
BY Robert M. Pierson
ATTORNEY I. R. RENNER.
CORD TIRE AND METHOD OF MAKING THE SAME.
APPLICATION FILED JUNE 17, 1916.
1,259,289.
Patented Mar. 12, 1918.
4 SHEETS—SHEET 4.
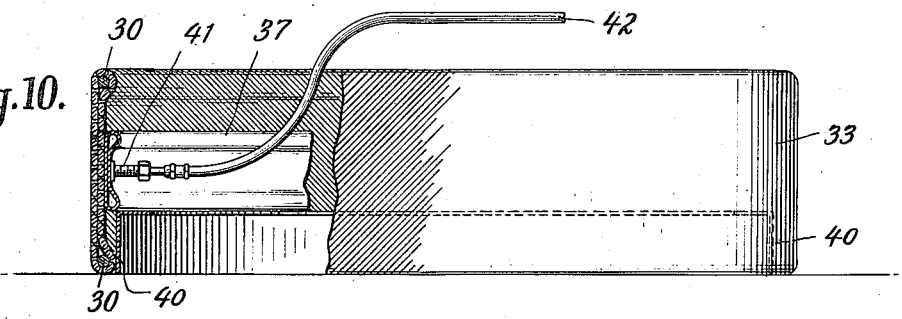
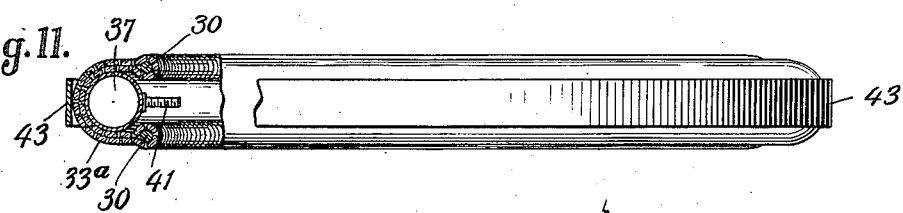
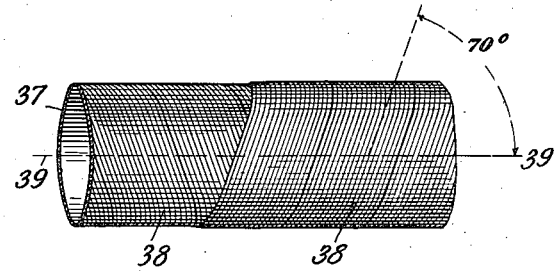
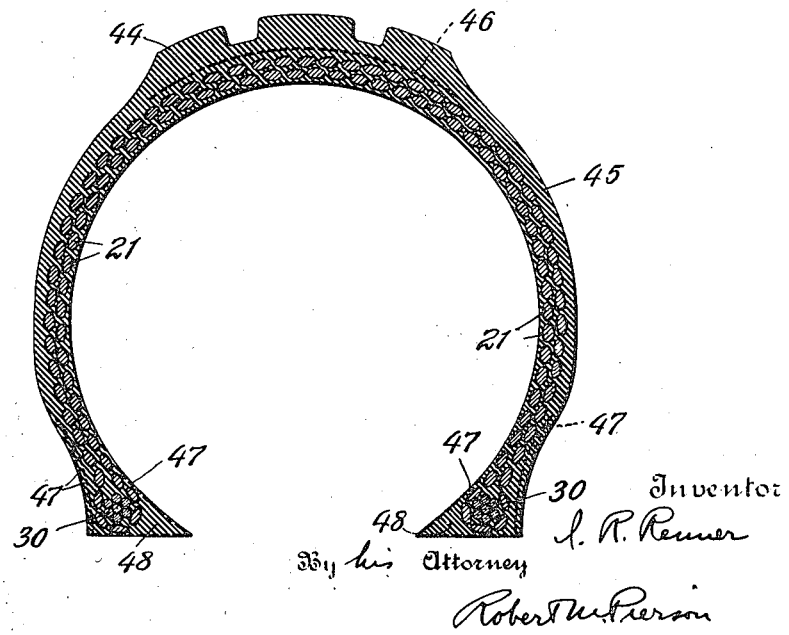

UNITED STATES PATENT OFFICE.

IRVIN R. RENNER, OF AKRON, OHIO, ASSIGNOR TO THE B. F. GOODRICH COMPANY, OF NEW YORK, N. Y., A CORPORATION OF NEW YORK.

CORD TIRE AND METHOD OF MAKING THE SAME.

1,259,289.
Specification of Letters Patent.
Patented Mar. 12, 1918.

Application filed June 17, 1916. Serial No. 104,289.

*To all whom it may concern:*

Be it known that I, IRVIN R. RENNER, a citizen of the United States, residing at Akron, in the county of Summit and State of Ohio, have invented certain new and useful Improvements in Cord Tires and Methods of Making the Same, of which the following is a specification.

This invention relates to the art of making pneumatic tire casings, and particularly that of making cord tires by forming a substantially cylindrical annular web having layers of cords which run diagonally from bead to bead and in opposite directions in successive layers, and then shaping said annular web preparatory to finishing and curing the tire. One object of my invention is to furnish an improved mode of shaping the cylindrical annulus into the substantial U section of a pneumatic tire casing, to which end I employ a reinforced fluid-pressure tube capable of circumferential elongation, and may use in conjunction therewith certain expedients for gaging the position of the tube and the amount of distention which said tube imparts to the tire.

Further objects are to facilitate the manufacture of the cylindrical annulus, and to provide an improved form of splice between the ends of the cords, as more fully described hereinafter.

Of the accompanying drawings,

Figure 1 is a plan view showing one method of laying up rubberized cords and facing them with sheet rubber to form a band.

Fig. 2 is a cross-section of the band.

Fig. 3 represents the mode of wrapping the band on a mandrel.

Fig. 4 is a view similar to Fig. 3 showing the band completely wrapped on the mandrel.

Fig. 10 is a side elevation, partly broken away, showing the shaping tube located in place and positioned by a gage.

Fig. 11 is a side elevation, partly in section, showing the tire shaped by the inflation of the tube and gaged to proper size by an external hoop.

Fig. 12 is a plan view illustrating the construction of the shaping tube.

Fig. 13 is a cross-section of the completed tire casing.

Figure 5:
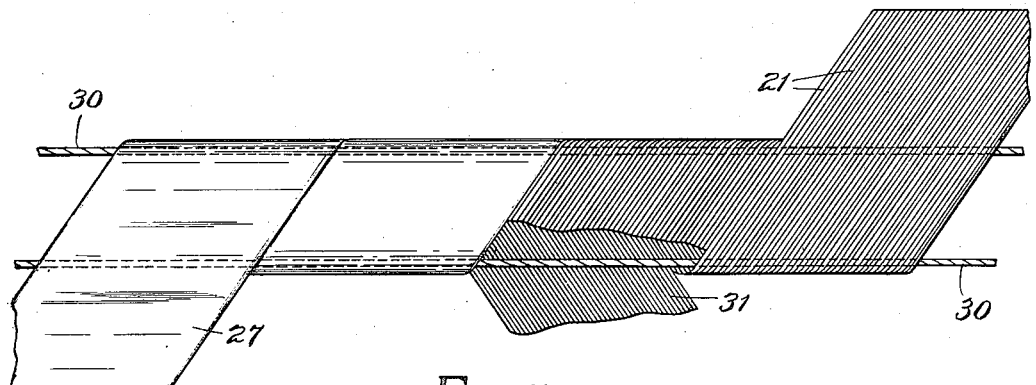
Fig. 5 is a plan view showing the bead wires in place.

Figs. 1 and 2 represent a method of laying up the cord band, this step as here represented being performable by hand, although I may execute it in any suitable way. First a thin sheet of vulcanizable rubber 20 is laid on a table and coated with rubber cement. I then lay on this sheet a series of twisted and cabled cotton or other fibrous cords 21, preferably impregnated with rubber. The cords are given a coating of rubber cement and on them is laid a thin top sheet of vulcanizable rubber 22, the object of the rubber sheets and cement being to hold the cord elements of the band together and enable the latter to be manipulated as a unit, and also eventually to furnish a vulcanized rubber bond connecting the cords with each other and with the other elements of the complete tire. The ends of the cords, and later the ends of the rubber sheets, are trimmed at an angle, as shown. The width of the band depends upon the cross-sectional diameter of the particular tire carcass and the desired "pitch" or angle of the cords with reference to the middle line of the tread, an angle of 45° being preferred although other angles may be used. Its width is further such that when the band is wrapped at the desired angle into the form of a tube, the adjacent edges of successive turns will meet, and there will be produced a continuous cord surface.

The length of the band is such as to make an annular cylindrical or transversely-flat tube of the desired circumferential length, using the circumference of the bead rings as a basis of calculation. This circumference is laid off between the points 23, 24 on a pole or mandrel 25 which is covered with a cloth liner 26 to prevent the rubberized band from sticking to its surface, and the band 27 is wrapped around said mandrel with the edges of its adjacent turns brought into close connection, the reference line 28 being ruled on its surface and the distance 23, 24 laid off when all but the last turn has been wrapped as indicated in Fig. 3.

As a band having the necessary width to make a continuous surface and give the desired angle to the cords, will, in its last turn, often have an excess of material over what is required to fill out the circumferential length of the size tire which is being made, in such cases, before wrapping the last turn on the mandrel I cut away from the outer edge of the band a strip of cords representing its excess width beyond the point 24, as indicated at 29, beginning at a distance from the line 28 representing half of the overlap for the splice (the other half of the overlap being at the right-hand or beginning end as shown) and I then complete the wrapping of the last turn as shown in Fig. 4 so that the tube will be of the exact desired length. The same result would be obtained by omitting a cord section of corresponding length, width and location when building up the band.

Figure 6:
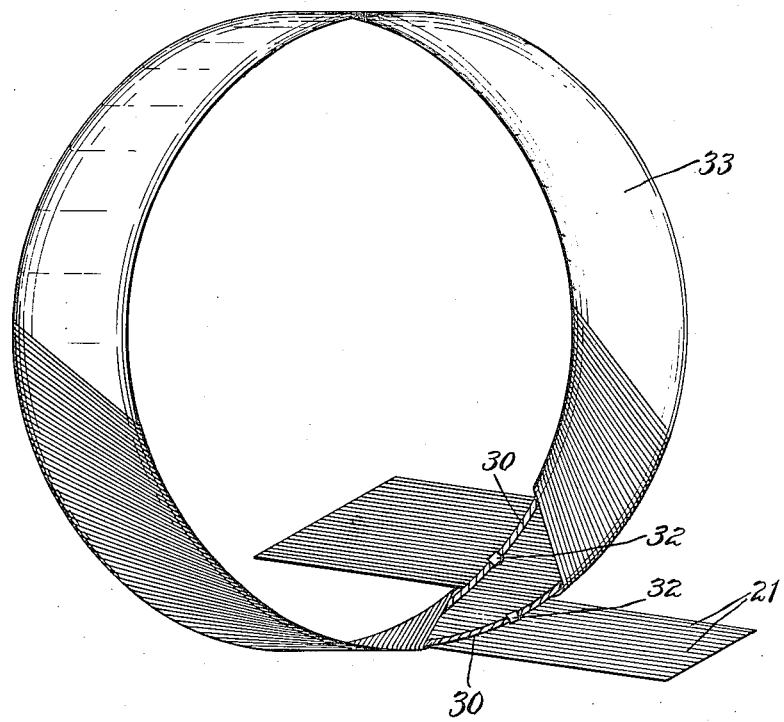
Fig. 6 is a perspective view showing the cord tube and bead wires after the ends of the latter have been connected and before the cord splice has been made.
Figure 7:
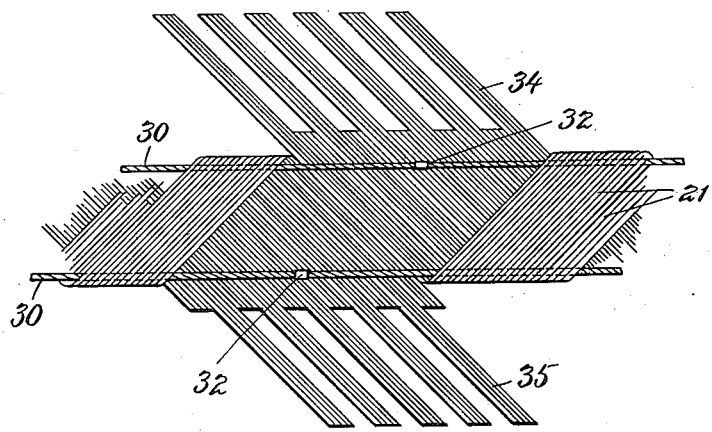
Fig. 7 is a plan view showing the ends of the cord band tongued to make the splice.
Figure 8:
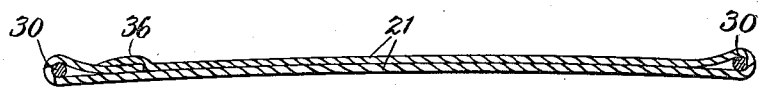
Fig. 8 is a cross-section of the completed splice.
Figure 9:
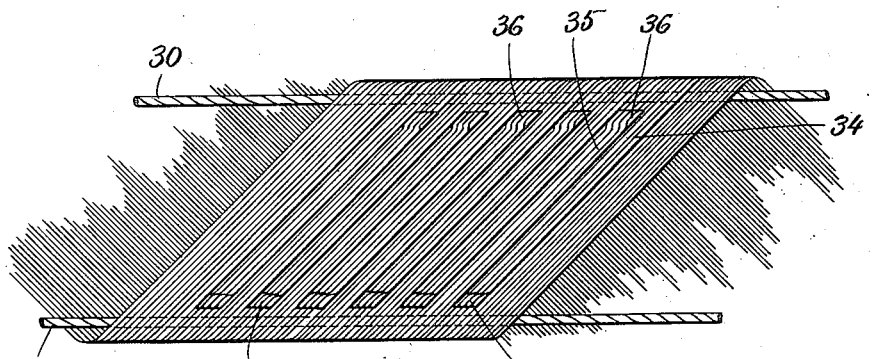
Fig. 9 is a plan view thereof.

After the helical joint line between the convolutions has been tooled to cause the edges to adhere firmly, the cord tube and its cloth liner 26 are slipped off the mandrel, the liner is withdrawn, and a pair of flexible wire cables 30, which are to form the bead rings or fillers, are inserted between the plies at the edges of the flat tube, as indicated in Fig. 5. These cables may be bare or may be provided with a rubber or other cover before insertion in the tire. In Fig. 5 a portion of the upper ply is represented as cut away and turned back at 31 to show that the cords in the two plies cross each other at an angle. The two plies are stuck together between the beads and the two ends of each wire cable are brought together and welded as shown at 32 in Fig. 6 so as to form complete rings, the splicing ends of the cord band being laid back to expose the rings as shown in this view, the tube being then substantially in the form of a cylindrical annulus 33.

The ends of the cord band are now cut parallel to the cords to form interfitting tongues 34, 35 on the respective ends, the spaces between the tongues on one end being equal to the width of the tongues on the other end, so that the tongues on the respective ends lie alongside of and between each other in the same plane, on the inner side of the annulus, for the greater part of their length, in a zone which coincides with the tread and side walls. Thereby I avoid an extra thickness of cord in any part of the tire wall which is subjected to substantial flexure or bending in action. For extra security the tongues are preferably overlapped on the main body of the inner ply as indicated at 36 in the immediate vicinity of the two bead rings 30. The splice may be otherwise constructed and located, but this form and location of splice have proven the most satisfactory and durable of several which I have tried.

The next step is to shape the cylindrical annulus or carcass forming web into the form of a pneumatic tire casing, substantially U-shaped in section, which involves a distention of the middle portion of the structure accompanied by a drawing together of the beads. While various ways of doing this might be employed, the following is a preferred method, which constitutes an improvement usable in connection with any tire-forming annulus of the general nature above described.

37 is an annular inflatable tube made of rubber reinforced with threads of twisted cotton or other suitable fiber, and so constructed that when inflated by air or other fluid under pressure, it will fill out to a substantially circular form in section, and will elongate circumferentially to a considerable degree but will not increase indefinitely in cross-sectional girth as will an ordinary non-reinforced rubber tube such as the inner tube of a tire when not confined on all sides, and may even decrease slightly. Preferably, I make this tube after the well-known mode of making Palmer bicycle tires, by wrapping diagonally in opposite directions two layers of bands, each band consisting of a calendered sheet or strip of rubber in which are embedded parallel twisted threads 38, but instead of following the practice in that art of laying the threads at an angle to the middle line 39—39 (Fig. 12) of less than 45°, resulting in a tube whose inner circumference contracts when inflated, I make the angle more than 55° (which is substantially the "neutral" angle at which the tube will neither expand nor contract), preferably between 65° and 85°, in order to furnish a tube which will elongate as described. Fig. 12 shows an angle of 70°, which I have used successfully in tubes for making tires of 4" section.

The two-ply tubular tire-forming annulus 33, containing the bead-filler rings 30 at its edges, is laid horizontally on a table, and an annular sheet-metal gage 40 of right-angled section is supported on the table within the annulus 33, the cylindrical portion of this gage fitting fairly close within the lower bead and its horizontal portion acting as a shelf for supporting the air tube 37 and positioning the latter in the middle of the cord annulus. The air tube 37, provided with an ordinary tire valve 41, is now inflated with compressed air through a hose 42 and thereby caused to assume a substantially-circular section as shown in Fig. 11, and at the same time to undergo a substantial elongation, whereby the cord annulus is caused to assume substantially its ultimate U-shape in cross-section by the distention of its middle portion and the drawing together of the beads. A cylindrical metal hoop 43, having an inner circumference equal to the desired outer circumference of the tire carcass, is slipped over the latter while it is being distended by inflation of tube 37, so as to act as a gage, and when the carcass 33ª has reached this circumference the hoop 43 is removed and the tire carcass is ready to have the tread and side strips 44, 45 of rubber (Fig. 13), breaker strip 46, bead-covers 47 of frictioned fabric, bead-corner strips 48, and other elements pertaining to the finishing of the raw tire applied while the carcass remains distended by the air tube 37. The tire casing will then be ready for vulcanization, which may be performed in the usual heated mold. During vulcanization the tire must be held distended and this is preferably done by means of a fluid-pressure annular bag or tube which is substituted for the tube 37, and is of a construction suited to withstand repeated vulcanizations while subjected to the internal hydraulic or other fluid pressure employed for the purpose of stretching and equalizing the tension on the cords and pressing the rubber surface of the tire outwardly against the mold.

The foregoing steps and the character of the devices employed may be variously modified without departing from my invention.

The complete tire casing shown in Fig. 13 is of the straight-side bead type but the invention may be used in connection with other types of beads. The use of corner or toe strips 48 of soft rubber avoids the necessity of using a flap to protect the inner tube when the tire is in use.

I claim:

1. In a method of making tire casings, the steps which comprise forming a substantially-cylindrical annular web with beaded edges, inserting an annular, reinforced tube adapted to stretch circumferentially but not laterally under inflation, leaving the beads unconfined, and inflating and stretching said tube until its inner periphery assumes a circumference as great as that of the beads and the web takes substantially its ultimate shape.

2. The method of shaping a substantially-cylindrical, beaded, tire-forming annulus which consists in inserting a circumferentially-extensible annular rubber tube reinforced by oppositely-wound layers of threads laid helically at an angle to a middle line exceeding 55°, and inflating and expanding said tube so as to bring said annulus substantially to the ultimate shape of the tire casing.

3. In a method of making open-sided cord-tire casings, the steps which comprise forming a cord band of a width adapted to form a continuous surface by a single winding at the desired angle, winding said band helically to form a tube, inserting bead fillers, joining said bead-fillers to form rings, joining the ends of the cord band to make an annulus, and shaping the annulus substantially to a U-section.

4. In a method of making open-sided cord-tire casings, the steps which comprise forming a band of cords held together by rubber, winding said band helically to make a flat annular tube and providing bead-filler rings at the edges, forming alternating tongues on the two ends of the band, and interfitting said tongues to make a splice.

5. In a method of making open-sided cord-tire casings, the steps which comprise forming a band of cords connected by rubber, said band having such width as to form a continuous surface when wound once at a desired angle, winding said band to form a tube, inserting bead-fillers at the edges and joining their ends to form rings, forming the ends of said band with alternating tongues, interfitting said tongues in the same plane in the inner ply of the carcass to form a splice, and overlapping the ends of said tongues with the body of the inner ply near the beads.

6. A cord-tire casing comprising bead-filler rings, and a two-ply carcass consisting of cords in band form looped around the rings and spliced with interfitting tongues formed by terminating some of the cords short of the others at intervals across each end of the band.

7. A cord-tire casing comprising bead-filler rings, and a band of cords forming inner and outer cord plies continuous with each other, looped around said rings, and spliced in the inner ply with interfitting tongues whose ends overlap the body of the inner ply adjacent to the beads.

8. A cord-tire casing comprising inextensible bead-filler rings, inner and outer cord plies continuous with each other and looped around said rings, fabric bead covers, and soft-rubber corner strips on the inner toes of the beads.

In testimony whereof I have hereunto set my hand this third day of June, 1916.

IRVIN R. RENNER.